(12) United States Patent
Sacca et al.

(10) Patent No.: US 6,741,162 B1
(45) Date of Patent: May 25, 2004

(54) POWER LINE NETWORKING APPARATUS AND METHOD

(75) Inventors: Frank Sacca, Diamond Bar, CA (US); Alberto Mantovani, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 450 days.

(21) Appl. No.: 09/678,983

(22) Filed: Oct. 4, 2000

(51) Int. Cl.[7] .............................................. H04M 11/04
(52) U.S. Cl. ............................ 340/310.01; 340/310.03; 340/310.06
(58) Field of Search ....................... 340/310.01, 310.03, 340/310.06, 310.08; 375/219, 220

(56) References Cited

U.S. PATENT DOCUMENTS

| | | | |
|---|---|---|---|
| 4,973,940 A | * 11/1990 | Sakai et al. ............ | 340/310.01 |
| 5,705,974 A | * 1/1998 | Patel et al. ............ | 340/310.08 |
| 5,777,544 A | * 7/1998 | Vander Mey et al. ... | 340/310.06 |
| 5,805,053 A | 9/1998 | Patel et al. | |
| 6,115,429 A | * 9/2000 | Huang ........................ | 375/317 |
| 6,445,087 B1 | * 9/2002 | Wang et al. ................ | 307/40 |
| 6,549,120 B1 | * 4/2003 | de Buda ................ | 340/310.01 |

FOREIGN PATENT DOCUMENTS

| | | |
|---|---|---|
| DE | 31 48 351 | 7/1982 |
| EP | 0 981 188 | 2/2000 |
| WO | 02/05451 | 1/2002 |

OTHER PUBLICATIONS

Form PCT/ISA/220, International Search Report dated Jun. 04, 2002.

* cited by examiner

*Primary Examiner*—Toan Ngoc Pham
(74) *Attorney, Agent, or Firm*—Procopio, Cory, Hargreaves & Savitch

(57) ABSTRACT

An apparatus for carrying electrical data signals and electrical power over a power line is disclosed. The apparatus includes a data processing device, a power supply, and a data signal transceiver. The apparatus also includes an interference filter coupled to the power line and to the power supply and configured to reject electromagnetic interference. A coupling circuit that is electromagnetically coupled to the power line is also disclosed. The coupling circuit is configured to transmit and receive data signals carried through the power line. The coupling circuit is coupled to the data signal transceiver. The data signal transceiver is configured to transmit and receive the data signals to and from the data processing device.

27 Claims, 3 Drawing Sheets

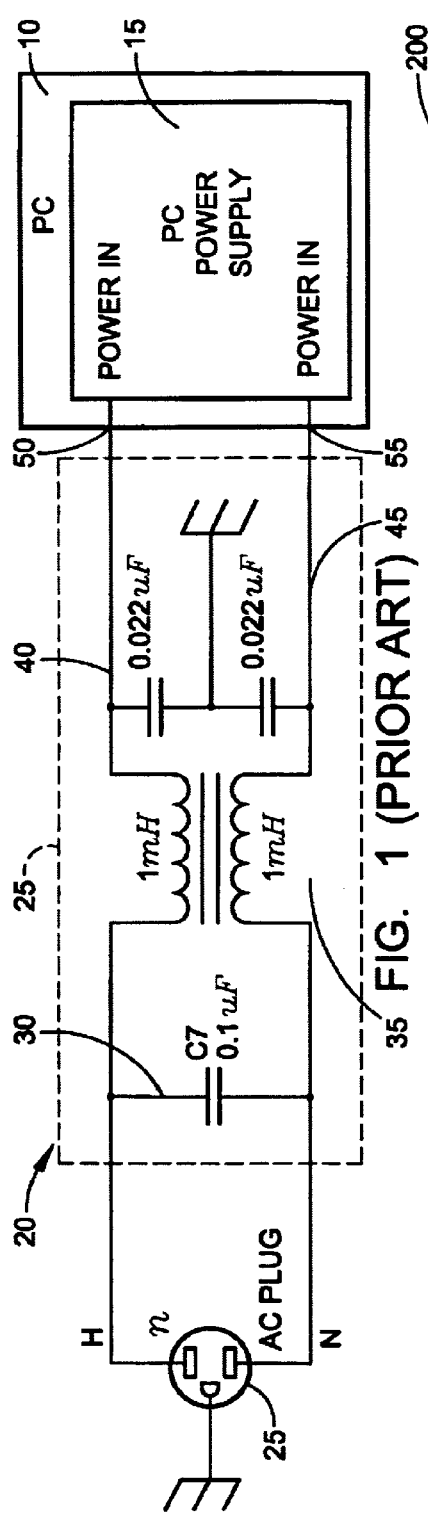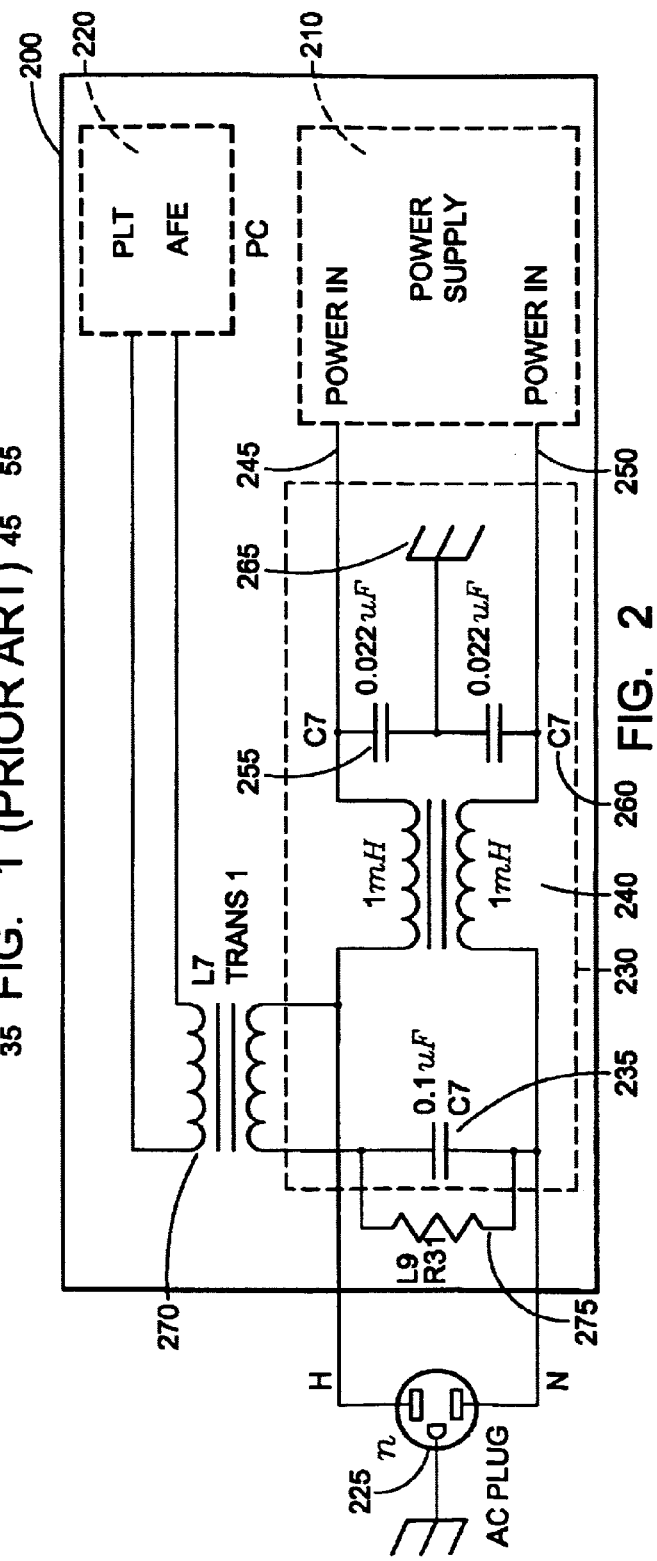

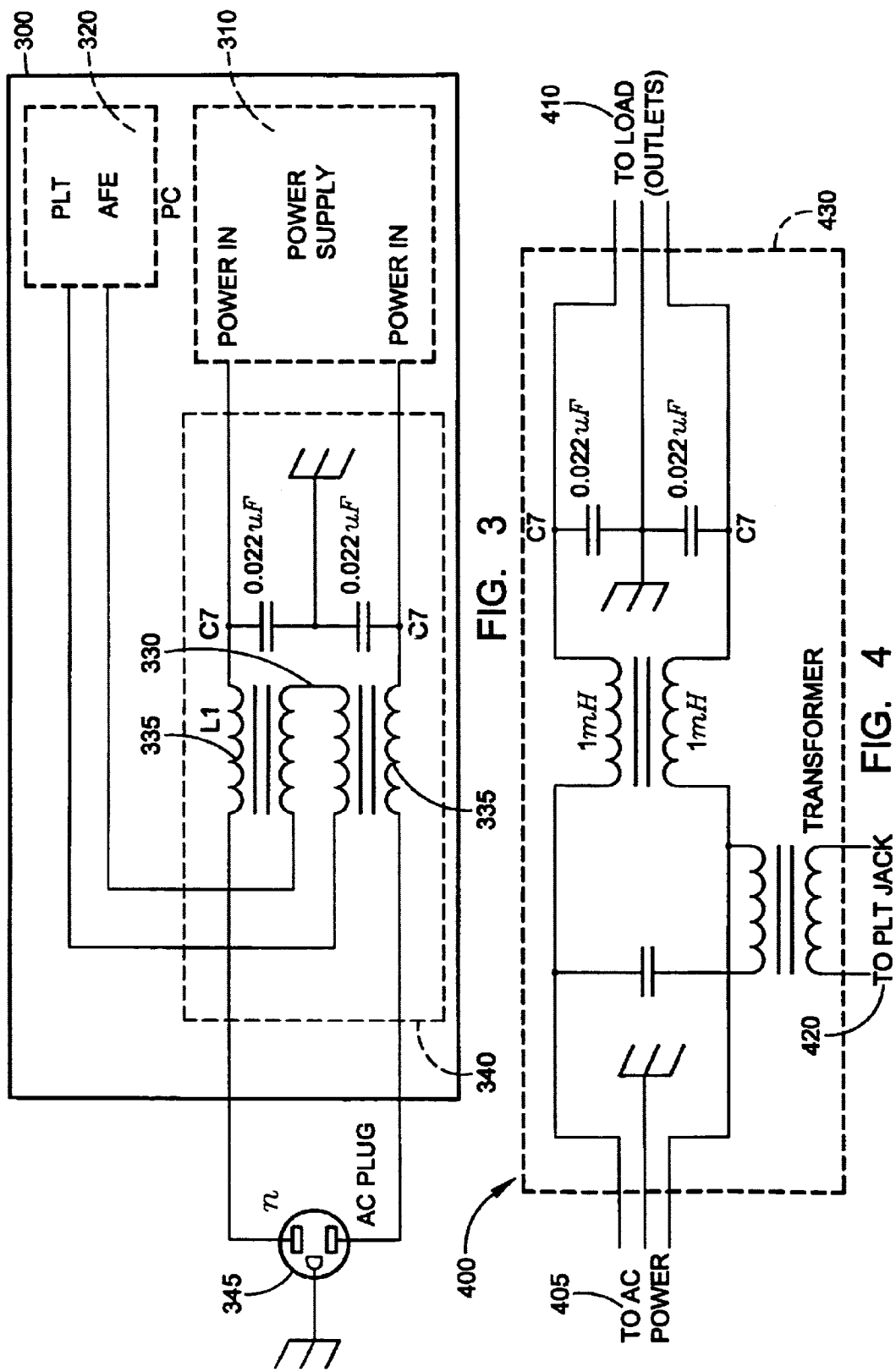

POWER LINE NETWORKING APPARATUS AND METHOD

FIELD OF THE INVENTION

The invention relates generally to the field of power line networking technologies. Further, the invention relates to a signal interface between a computer's power supply line and a computer's data communications interface.

BACKGROUND OF THE INVENTION

Power line technology (PLT) has been and will continue to be introduced to the consumer market at a fast pace to support in home networking or other local network situations. For example, multiple computers in the home may be networked together by utilizing the home's power line circuitry to carry data communication signals at a frequency different from the frequency at which power is transmitted. Further, other data processing devices may be networked in the home in a similar manner. For example, appliance devices in the home may be networked using power line technology as well as in home communication devices, such as telephones, video devices, home security devices, monitoring devices, etc.

Conventionally, personal computers (PCs) are not necessarily optimized to support PLT. Currently, a basic architecture of an add-on PLT system is either an internal PC card (e.g., ISA or PCI), that the user installs in an existing computer, or an external stand-alone box with a USB or parallel cable interfaced to the PC. The PLT module, whether it be internal or external, must be coupled in some manner to the power line. Generally, the PLT module is coupled to the power line by plugging a signal coupler module into an empty power outlet in the vicinity of the personal computer. In order to accomplish this coupling, the existence of an empty power outlet is needed, which is rarely the case in the vicinity of a personal computer system, because monitors, printers, and other accessories are normally present and connected to a power strip. In the case that an empty outlet is available, the user is forced to couple the PLT module to a relatively noisy power node, where the PC is directly connected, without adequate filtering. Coupling the PLT module to a noisy power node has the potential to affect operation and performance of the PLT network, depending on the type of power supply used for the PC and any accessories connected to it.

In the case that a power strip is being used, conventional power strips may contain filters, which effectively decouple high-frequency signals from the power line. Therefore, it is not necessarily appropriate to couple a PLT adapter to the power strip for optimum performance, because some of the high-frequency signals, which the power strip may filter out, may be needed for proper PLT home networking communication. Even if the power strip does not contain filters, it is not appropriate to couple a PLT module to the power strip or to an outlet in its vicinity because of the excessive noise and low impedance presented by the PC power supply and all its peripherals connected to the strip.

In a typical PLT networking interface, a transformer interface is used to couple the high-frequency data carrier signal to the power line. The transformer's primary winding is connected to the alternating current (AC) outlet of the power line through a coupling capacitor. The transformer's secondary winding is connected to a data carrier signal driver/receiver within the PC or the PLT module. The transformer isolates the PC system from the power line and at the same time rejects AC electrical power signal component. Furthermore, the transformer is coupled to the power line by a physical connector other than the PC power cable, to avoid any interference caused by the PC switching power supply.

Prior coupling technology is generally rudimentary, as an external port needs to be provided on a PC to support the connection of the data carrier signal to the power line, when the PC is already connected to the power line through the PC power cord. Further, a complete, self-contained interconnection module is required from the PC to the AC power outlet to provide the necessary coupling function. Thus, substantial expense for PLT networking devices lies in the redundancy of connections to the power line network, where the PC is already connected.

Referring to FIG. 1, a personal computer (PC) 10 of the prior art is depicted. PC 10 includes, among other hardware, a PC power supply 15. PC power supply 15 conventionally includes a power cord 20 including an AC plug 25, for coupling to a conventional power receptacle. In an exemplary embodiment, AC plug 25 may be, but is not limited to a J-type plug. In a typical implementation, an electromagnetic interference (EMI) filter 25 is coupled between power cord 20 and PC power supply 15. A conventional EMI filter 25 includes a capacitor 30 coupled across the hot (H) and neutral (N) terminals of AC plug 25. A transformer 35 is coupled between the H and N terminals and to the capacitors 40 and 45 coupled between the H terminal and ground and between the N terminal and ground respectively. Power line EMI filter 25 is typically present in most switching power supplies. Transformer 35 is commonly implemented as two common mode choke (same toroid) inductors in series with the power supply terminals 50 and 55. The two inductors are wound on a common toroid, and their purpose is to suppress EMI emission from the internal power supply circuitry by de-coupling high-frequency noise from the power line (inductors typically present high impedance to high-frequency). In a conventional implementation, the value of such inductors is on the order of one milliHenry (mH). In a conventional implementation capacitor 30 which may be on the order of 0.1 microFarads (uF) may or may not be added across H and N to further de-couple noise injected to the power through the PC power cord.

Accordingly, there is a need for a PLT networking device that couples the signal driver/receiver within the PC to the power line without an external port, power/signal line, and/or interconnection module. Further, there is an alternative need for a PLT adapter for retrofitting existing PCs, having a PLT analog front end (AFE) card, the PLT adapter including data signal input, a power line input and a power output for coupling to the PC power supply. Further, there is another alternative need for a power strip that is optimized for PLT home networking. The power strip includes a power filter built into the power strip with a PLT coupler.

SUMMARY OF THE INVENTION

An exemplary embodiment of the invention relates to an apparatus for carrying electrical data signals and electrical power over a power line. The apparatus includes a data processing device, power supply, and a data signal transceiver. Further, the apparatus includes an interference filter coupled to the power line and to the power supply and configured to reject electromagnetic interference. Further still, the apparatus includes a coupling circuit electromagnetically coupled to the power line. The coupling circuit is configured to transmit and receive data signals carried through the power line. The coupling circuit is also coupled to the data signal transceiver. The data signal transceiver is configured to transmit and receive the data signals to and from the data processing device.

Another exemplary embodiment of the invention relates to a power strip configured for power line networking. The power strip includes an electrical plug. The power strip also includes a power filter for rejecting electromagnetic interference. The power filter is coupled to the electrical plug. The power strip further includes an inductor coupled to the power filter and coupled to a signal coupling. Further still, the power strip includes a power outlet coupled to the power filter.

Yet another exemplary embodiment of the invention relates to a power line networking adapter. The power line networking adapter includes a power line coupling input. The power line networking adapter also includes an interference filter coupled to the power line coupling input. Further, the power line networking adapter includes an electromagnetic circuit coupled to the filter circuit. Further still, the power line networking adapter includes a data signal connector coupled to the electromagnetic circuit.

Still yet another exemplary embodiment of the invention relates to a method of coupling a data processing device to a power line, the power line carrying electrical power and a data signal. The method includes coupling a power supply for the data processing device to the power line through an interference filter, the interference filter is configured to reject electromagnetic interference. The method also includes electromagnetically coupling a data signal carrier from a data signal transceiver to the power line to provide an electromagnetic coupling circuit. The electromagnetic coupling circuit is configured to transmit and receive the data signal being carried over the power line

BRIEF DESCRIPTION OF THE DRAWINGS

The invention will become more fully understood from the following detailed description, taken in conjunction with the accompanying drawings, wherein like reference numerals refer to like elements, in which:

FIG. 1 is a diagram of a power cord for a PC including an EMI filter;

FIG. 2 is a diagram of an exemplary embodiment of a power line networking interface;

FIG. 3 is a diagram of another exemplary embodiment of a power line networking interface;

FIG. 4 is a diagram of an exemplary embodiment power line networking module;

DETAILED DESCRIPTION OF EXEMPLARY EMBODIMENTS

Figure 5:
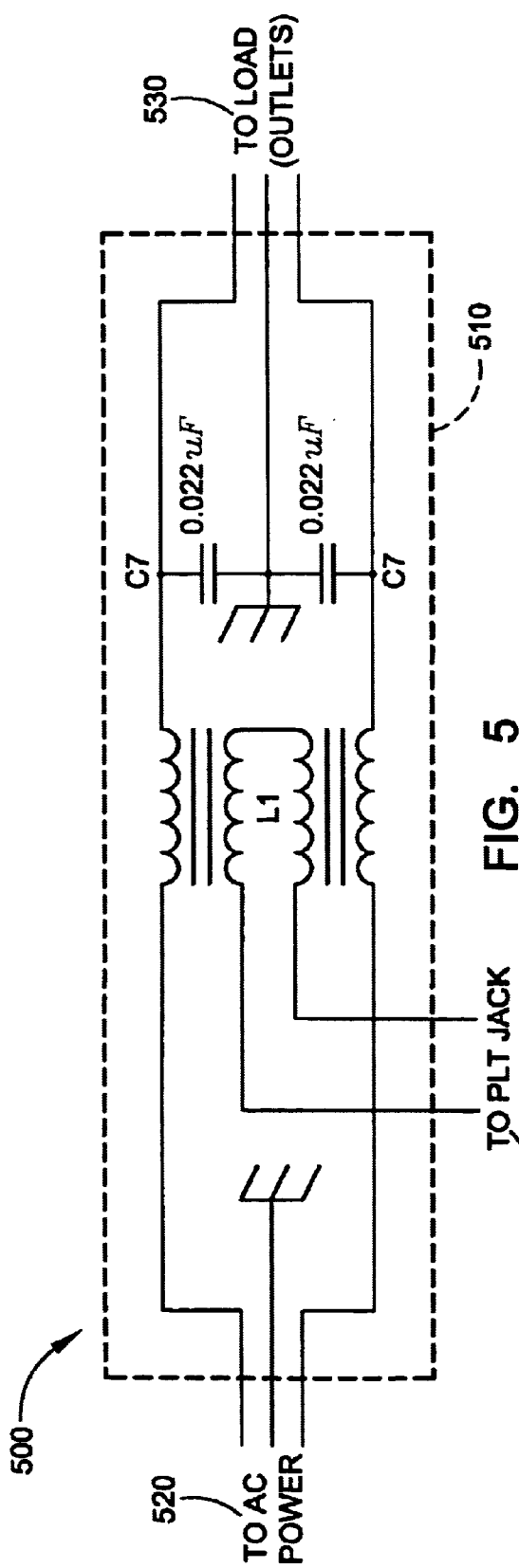
FIG. 5 is a diagram of an alternative exemplary embodiment of a power line networking module.

The following patent applications are hereby incorporated by reference in their entirety:

Commonly assigned U.S. patent application, Ser. No. 09/679,238, entitled "POWER SUPPLY ARCHITECTURE FOR POWER-LINE NETWORKING," filed concurrently herewith; and Commonly assigned U.S. Patent Application, Ser. No. 09/679,413, "POWER SUPPLY WITH SMALL-SIGNAL COUPLING FOR POWER-LINE NETWORKING," filed concurrently herewith.

Commonly assigned U.S. Patent Application, Ser. No. 09/679,414, entitled "POWER SUPPLY WITH DIGITAL DATA COUPLING FOR POWER-LINE NETWORKING" filed concurrently herewith.

Referring now to FIG. 2, an exemplary embodiment of a PC 200, includes a power supply 210 and a PLT analog front end (AFE) 220. PLT AFE 220 may be a part of power supply 210 as described in the incorporated references entitled "POWER SUPPLY WITH SMALL-SIGNAL COUPLING FOR POWER-LINE NETWORKING," and "POWER SUPPLY WITH DIGITAL DATA COUPLING FOR POWER-LINE NETWORKING" Power supply 210 is utilized to receive power input from a power source, such as, but not limited to, a typical in home (or other, such as an office) power line (120 volts, 60 hertz, e.g.). PLT AFE 220 is utilized to send and receive data signals to and from PC 200 (PLT AFE 220 operates as a communications driver/receiver or transceiver). In an exemplary embodiment, power supply 210 is coupled to an AC plug 225 through an EMI filter 230. Also, in an exemplary embodiment EMI filter 230 includes a capacitor 235 coupled between the N terminal of AC plug 225 and a transformer 270, an inductor 240 coupled in series with AC plug 225 and power supply 210, and to capacitors 255 and 260 coupled between PC power terminals 245 and 250 respectively and to ground 265. EMI filter 230 is used to filter out noise being generated in switching power supply 210, so that when PC 200 is connected to the power line, high-frequency noise generated by power supply 210 is not sent through the power line. EMI filter 230 is used to filter out noise being generated switches and in power supply 210, so that when PC 200 is connected to the power line, high frequency noise generated by power supply 210 is not sent through the power line. As depicted in FIG. 2 the traditional PC switching power supply is modified to simplify the architecture of a power line interface design. The power supply is modified in such a way as to optimize the data carrier signal coupling from the PC to the power line without the need for an external connection from the PC motherboard power line.

In the exemplary embodiment depicted in FIG. 2, a coupling transformer 270 is connected to the H and N terminals through a low-frequency blocking capacitor 235, which replaces the existing 0.1 microFarad (uF) capacitor 35 (see FIG. 1). Further, in an exemplary embodiment an optional resistor 275 may be added in parallel with capacitor 235 to discharge capacitor 235 when AC plug 225 is unplugged. EMI line filter 230 still serves to reject high-frequency signals produced by power supply 210. PLT AFE 220 then is configured to send and receive data signals generally in the range from 2 megahertz to 50 megahertz, or in an exemplary embodiment from 4 megahertz to 22 megahertz. In a particular embodiment, transformer 270 and EMI filter 240 may be incorporated as a part of PC 200, such as, but not limited to, as a portion of the motherboard of PC 200. Further, EMI filter 230 and transformer 270 may be incorporated into part of power supply 210 with a connection to PLT AFE 220 within the PC 200 case.

Referring now to FIG. 3, another exemplary embodiment of a PC 300 includes a power supply 310 and a PLT AFE 320. In this exemplary embodiment, a wire represented as wire 330 is wound on the same toroid core that supports the two common-mode one milliHenry (mH) inductors 335 of EMI filter 340. Coupling wire 330 with the existing core of inductors 335 provides an efficient coupling mechanism for the high-frequency data carrier to and from PLT AFE 320 and to and from an AC plug 345, without the need for a coupling capacitor or an additional transformer. In an exemplary embodiment, filter 340 and hence wire 340 may be incorporated into PC 300, or in an alternative embodiment, EMI 340 includes wire 330 which may be external to PC 300 and configured as a power cord adapter module.

Referring to both FIGS. 2 and 3, each of the embodiments has a primary advantage of reducing costs as compared to conventional PLT coupling interfaces. The cost of an external port on the PC and a stand-alone cable along with a coupling module to the power line may be eliminated by using circuitry depicted in FIGS. 2 and 3 without sacrificing performance of a network. A further advantage of embodiments depicted in FIGS. 2 and 3 are the convenience of the end user of a network product because to use this technology, an end user needs to only connect the PC power cord to an AC outlet. No external connection to and from the PC to the power line is required other than the power cord itself. Another advantage of the embodiment depicted in FIG. 3 is that the coupling circuit to the power line may not have a pronounced loading effect on the power as compared with the impedance associated with a separate data communications line and a separate power supply line. Multiple loading effects on the power line are therefore eliminated.

Users of personal computers or other electronic or data processing devices having an add-on PLT card or add-on PLT device may require a data signal connection to the power line. FIG. 4 depicts a PLT module 430 for enabling PLT functionality on devices being upgraded or retrofitted with a PLT card or PLT device. A module 400 for coupling between an AC power supply 405 and a load 410, such as, but not limited to a PC, and further between AC power supply 405 and a PLT jack 420, is depicted in FIG. 4. Module 400 includes the same circuitry as depicted in FIG. 2, however, the circuitry to interface between power supply 405, load 410, and PLT jack 420 is integrated into a single module (or adapter) 430, which may be a module (or adapter) connected at the PC, at the AC plug, or anywhere in between.

The use of PLT module 430 adds significant benefits to the application of power line networking in existing PC systems. First, an empty outlet is not required in the vicinity of the PC system to couple the add-on module to the power line, which in some cases means that the purchase of an additional power strip can be avoided. Second, the user is not burdened with the task of figuring out the best location to couple the add-on card to the power line, which would probably imply customer support calls and the like, and is not forced to reconfigure the existing interconnections of power cords to fit an additional clumsy plug module. Third, but not so limited, the PLT module 430 is an intermediate module between the power line and the PC power supply, in addition to being a high-frequency signal coupler with an effective filter to minimize noise from the PC switching power supply that may effect adequate operation of the networking system.

Module 430, which may be referred to as a PLT adapter, can be inserted externally between the AC socket of the PC power,supply and the power cord that normally plugs into the AC socket. The PLT module 430 may have an input socket on one side much like the one found in the PC power supply, and an output plug on the other side, similar to the plug found in the PC power cord (that fits into the PC power supply socket). Furthermore, PLT module 430 would include a PLT interface jack 420 which may be a standard RJ11 type or BNC connector, or any other type of jack or connector, where the PLT add-on module would be connected for coupling to the power line. In an exemplary embodiment, PLT module 430 could be completely molded in plastic, with input and output elements available for connection to the PC power supply, the power line, and the PLT add-on card or PLT device (internal or external). In an alternative embodiment, PLT module 430 may be completely embedded and molded within the PC power cord itself. Accordingly, the power cord itself would be a PLT adapter with an output for connection to the PLT add-on module, and the normal AC power connections to the power line at one end and the PC power supply at the other end. PLT module 430, although conceptually packaged in a different manner than the circuitry described with respect to FIG. 2, includes a power line filter to de-couple noise from the PC power supply and the high-frequency signal coupling mechanism, as depicted in FIG. 2.

Referring now to FIG. 5, an exemplary PLT networking interface 500 is depicted. PLT networking interface 500 includes a PLT networking module 510 coupled between an AC power source 520, a load, such as a PC 530, and a PLT jack 540. PLT module 510 utilizes the same circuitry as depicted and described with respect to FIG. 3. As described with respect to FIG. 4, PLT module 510 is a power cord adapter with a coupling apparatus for power line networking. In particular, module 510 includes a PLT jack 540 for coupling to a PLT AFE to send and receive data signals to and from PLT AFE through AC power supply 520.

Figure 6:
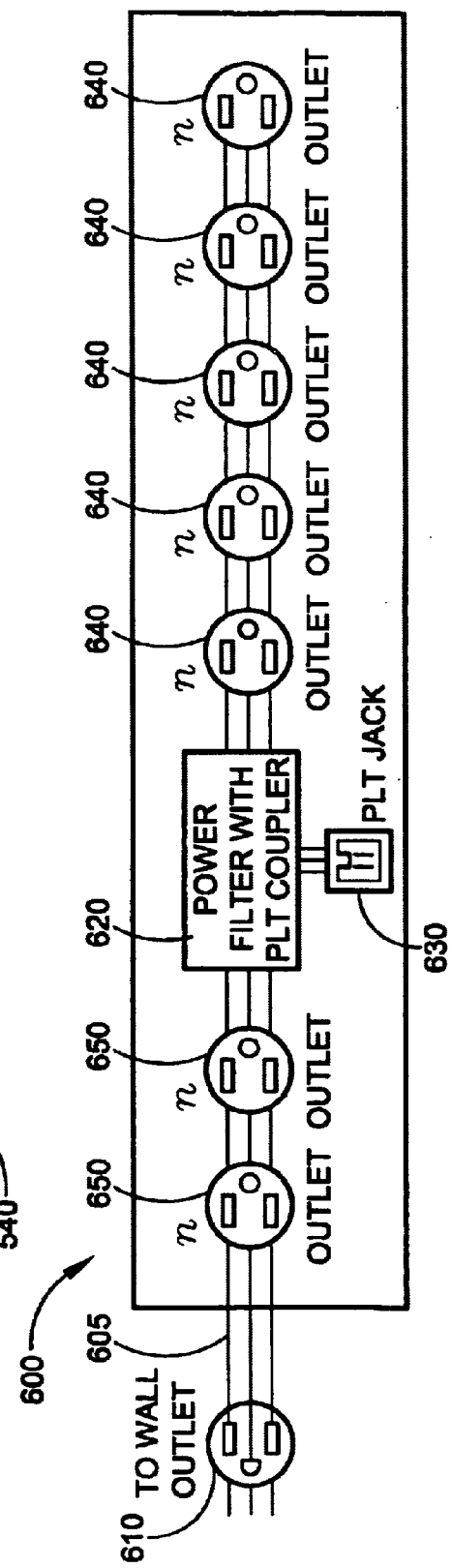
FIG. 6 is a diagram of a power strip including a power filter with a coupler for power line networking.

Referring now to FIG. 6, a PC power strip 600 is depicted. PC power strip includes a power cord 605 coupled to an electrical plug 610. Power cord 605 is coupled to a power filter with a PLT coupler 620. Power filter with PLT coupler 620 may be, in an exemplary embodiment, circuitry depicted in FIG. 4 or circuitry depicted in FIG. 5, for example. Power strip 600 includes an integrated PLT jack 630 and a plurality of electrical outlets 640. Power strip 600 includes a built-in coupling apparatus 620 for PLT networking, including adequate filtering to de-couple noise from the computer system and its peripherals coupled to electrical outlets 640. The solution offers consumers a way to efficiently couple high-frequency signals to the power line without being effected by the specific PC and peripherals used. Power strips 600, may be generalized, in an exemplary embodiment, to an improved wall-mount power adapter for PLT home networking, or to an improved wall electrical outlet containing an output jack for PLT signal coupling, having similar internal circuit topology as the power strip, such as the circuitry depicted in FIGS. 4 and 5. PLT jack 630 may be, but is not limited to a standard RJ11 type jack. In an exemplary embodiment power strip 600 includes electrical outlets 650 which may be unfiltered outlets. Outlets 650 may be used to provide electrical power and data signals to devices that are already PLT compliant (i.e., the devices already contain filters, such as, but not limited to EMI filters 430 and 510, depicted in FIGS. 4 and 5. In alternative exemplary embodiments electrical outlets 650 may not be present.

The use of power strip 600 adds significant benefits to the application of PLT networking. An empty outlet is not required in the vicinity of the PC system to couple a PC add-on card to the power line, which in some cases may avoid the purchase of an additional power strip. The user is not burdened with the task of deciding the best location to couple the add-on card to the power line, which would probably imply customer support calls to the card manufacturer and is not forced to reconfigure the existing inner connections of power cords to fit an additional clumsy plug module. Power strips 600 provides an intermediate filtering effect between the power line and the PC power supply with all peripherals, in addition to being a high-frequency signal coupler for the PLT data carrier signal, which minimizes noise from the various power supply interfaces and can substantially improve performance and operation of the PLT home networking system.

Although exemplary embodiments refer to personal computers coupled to a home power line, the invention may also be applied to other types of devices communicating on a network, not necessarily a home network, and not necessarily a personal computer.

Further, while the exemplary embodiments refer to specific types of jacks, couplers, and plugs, the terms are to be interpreted broadly. The embodiments may encompass those situations in which any type of electrical or optical, RF, ultrasonic, and the like coupling is made between the data processing device and the power supply.

Further still, those who have skill in the art will recognize that the invention is applicable with many different hardware configurations, software architectures, communications protocols, and organizations or processes.

While the detailed drawings, specific examples, and particular formulations given describe exemplary embodiments, they serve the purpose of illustration only. The materials and configurations shown and described may differ depending on the chosen performance characteristics and physical characteristics of the application. For example, the type of networking or networking protocols used may differ. The systems shown and described are not limited to the precise details and conditions disclosed. Furthermore, other substitutions, modifications, changes, and omissions may be made to the design, operating conditions, and arrangement of the exemplary embodiments without departing from the scope of the invention as expressed in the appended claims.

What is claimed is:

1. An apparatus for sending and receiving electrical data signals to and from a power line, and for receiving electrical power from the power line, comprising:
    a power line coupling configured to be coupled to the power line;
    a power supply;
    a data signal transceiver;
    an interference filter coupled between the power line coupling and the power supply for providing a first path for delivery of electrical power from the power line coupling to the power supply and for rejecting high frequency electromagnetic interference; and
    a coupling circuit coupled between the power line coupling and the data signal transceiver for providing a second path for exchange of electrical data signals between the data signal transceiver and the power line coupling and for rejecting low frequency signals.

2. The apparatus of claim 1, wherein the electrical power has a first frequency and the electrical data signals have a second frequency different than the first frequency.

3. The apparatus of claim 2, wherein the first frequency is in the range of 50 to 60 (Hz).

4. The apparatus of claim 2, wherein the second frequency is in the range of 2 to 50 megaHertz (MHz).

5. The apparatus of claim 1, wherein the interference filter includes at least one capacitor.

6. The apparatus of claim 1, wherein the interference filter includes a filter transformer having a filter transformer core.

7. The apparatus of claim 6, wherein the filter transformer includes a wire wrapped around the filter transformer core to electromagnetically couple the power supply to the power line coupling.

8. The apparatus of claim 1, wherein the interference filter and the coupling circuit are integrated into a personal computer.

9. The apparatus of claim 1, wherein the data signal transceiver is a power line technology analog front end circuit.

10. The apparatus of claim 1, wherein the coupling circuit and the interference filter are integrated into a module coupled between the power line coupling and the power supply.

11. The apparatus of claim 10, wherein the module includes a coupling for a data line, the data line configured to carry the electrical data signal.

12. The apparatus of claim 11, wherein the data line coupling is an RJ11 jack.

13. The apparatus of claim 11, wherein the data line coupling is a BNC connector.

14. The apparatus of claim 1, wherein the coupling circuit and the interference filter are integrated into a power strip.

15. The apparatus of claim 14, wherein the power strip includes at least one electrical outlet.

16. The apparatus of claim 14, wherein the power line coupling is an electrical plug coupled to the power strip.

17. The apparatus of claim 14, wherein the power strip includes a power line transformer coupling configured to connect a data line, the data line configured to carry the electrical data signal.

18. The apparatus of claim 17, wherein the power line transformer coupling is an RJ11 jack.

19. The apparatus of claim 17, wherein the power line transformer coupling is a BNC connector.

20. The apparatus of claim 1, wherein:
    the interference filter comprises a first transformer; and
    the coupling circuit comprises a second transformer and a low-frequency blocking capacitor coupled between the data signal transceiver and the power line coupling.

21. The apparatus of claim 20, wherein the power line coupling is an AC plug having hot (H) and neutral (N) terminals, and wherein the second transformer is coupled to the H and N terminals through the low-frequency blocking capacitor.

22. The apparatus of claim 21, wherein the coupling circuit further comprises a resistor coupled in parallel with the low-frequency blocking capacitor to discharge the capacitor when the AC plug is not coupled to the power line.

23. The apparatus of claim 1, wherein:
    the interference filter comprises a toroid core supporting two common-mode inductors; and
    the coupling circuit comprises a wire wound on the toroid core of the interference filter.

24. An apparatus for receiving electrical power from an AC plug coupled to a power line and delivering the electrical power to a power supply, and for exchanging electrical data signals between the AC plug and a PLT analog front end (AFE), the apparatus comprising:
    an interference filter configured to be coupled between the AC plug and the power supply for providing a first path for delivery of electrical power from the power line coupling to the power supply and for rejecting high frequency signals; and
    a coupling circuit configured to be coupled between the AC plug and the PLT AFE for providing a second path for exchange of electrical data signals between the PLT AFE and the AC plug and for rejecting low frequency signals.

25. The apparatus of claim 24, wherein:

the interference filter comprises a first transformer; and the coupling circuit comprises a second transformer coupled to hot (H) and neutral (N) terminals of the AC plug through a low-frequency blocking capacitor.

26. The apparatus of claim 25, wherein the coupling circuit further comprises a resistor coupled in parallel with the low-frequency blocking capacitor to discharge the capacitor when the AC plug is not coupled to the power line.

27. The apparatus of claim 24, wherein:

the interference filter comprises a toroid core supporting two common-mode inductors; and the coupling circuit comprises a wire wound on the toroid core of the interference filter.

* * * * *